United States Patent
Jarnikov et al.

(10) Patent No.: US 10,241,720 B2
(45) Date of Patent: Mar. 26, 2019

(54) METHOD AND SYSTEM FOR PROVIDING CONTENT TO A RECIPIENT DEVICE

(75) Inventors: Dmitri Jarnikov, Hoofddorp (NL); Jeroen Mathias Doumen, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 785 days.

(21) Appl. No.: 13/821,935

(22) PCT Filed: Sep. 8, 2011

(86) PCT No.: PCT/EP2011/065561
§ 371 (c)(1),
(2), (4) Date: Mar. 8, 2013

(87) PCT Pub. No.: WO2012/032122
PCT Pub. Date: Mar. 15, 2012

(65) Prior Publication Data
US 2013/0166868 A1    Jun. 27, 2013

(30) Foreign Application Priority Data

Sep. 9, 2010 (EP) .................................. 10175973

(51) Int. Cl.
*G06F 3/06* (2006.01)
*H04N 21/2389* (2011.01)
(Continued)

(52) U.S. Cl.
CPC ..... *G06F 3/0655* (2013.01); *H04N 21/23892* (2013.01); *H04N 21/23895* (2013.01); *H04N 21/8358* (2013.01); *H04N 21/8456* (2013.01)

(58) Field of Classification Search
CPC .............. G06F 3/0665; H04N 21/8358; H04N 21/23892; H04N 21/8456; H04N 21/23895
See application file for complete search history.

(56) References Cited

U.S. PATENT DOCUMENTS

| | | | |
|---|---|---|---|
| 7,058,809 B2 * | 6/2006 | White | H04N 1/32272 348/E7.056 |
| 7,320,069 B1 * | 1/2008 | Sundharraj | G06F 21/10 348/E7.056 |

(Continued)

OTHER PUBLICATIONS

PCT International Search Report and the Written Opinion issued in corresponding application No. PCT/EP2011/065561, dated Dec. 15, 2011 (13 pgs).

(Continued)

*Primary Examiner* — Khoi V Le
(74) *Attorney, Agent, or Firm* — Marc Kaufman; Rimon Law

(57) ABSTRACT

The invention relates to a computer-implemented method for providing content to a particular recipient device of a plurality of recipient devices. Copies of one or more content elements of the content are generated and one or more of the copies are modified to obtain modified copies of the content elements. The content elements, including the one or more modified copies of the content elements, are stored in a storage. Selection information is transmitted to the particular recipient device in response to a request for providing the content. The selection information prescribes to the recipient device the modified copy to be retrieved by the recipient device for substantially each content element for which a modified copy is available.

15 Claims, 6 Drawing Sheets

(51) Int. Cl.
*H04N 21/8358* (2011.01)
*H04N 21/845* (2011.01)

(56) References Cited

U.S. PATENT DOCUMENTS

| | | | | |
|---|---|---|---|---|
| 7,533,027 | B2* | 5/2009 | Odgers | G06F 21/10 |
| | | | | 705/1.1 |
| 8,601,590 | B2* | 12/2013 | Nakano | G06F 21/16 |
| | | | | 705/57 |
| 2005/0278259 | A1* | 12/2005 | Gunaseelan | G06F 21/10 |
| | | | | 705/59 |
| 2006/0177096 | A1* | 8/2006 | Malik | G06F 21/10 |
| | | | | 382/100 |
| 2007/0039028 | A1* | 2/2007 | Bar | H04N 21/23439 |
| | | | | 725/95 |
| 2008/0092181 | A1* | 4/2008 | Britt | H04N 7/1675 |
| | | | | 725/87 |
| 2010/0088505 | A1* | 4/2010 | Coppola | H04L 63/0428 |
| | | | | 713/153 |
| 2011/0088054 | A1* | 4/2011 | Malik | G10L 13/043 |
| | | | | 725/29 |

OTHER PUBLICATIONS

EPO Search Report issued in corresponding application No. 10175973. 6, dated May 16, 2011 (8 pgs).

Pantos, R., "HTTP Live Streaming," Apple Inc., May 1, 2009 (16 pgs).

Zambelli, A., "IIS Smooth Streaming Technical Overview," Microsoft Corporation, Mar. 2009 (17 pgs).

Yao et al., "Decentralized Authorization and Data Security in Web Content Delivery," Proceedings of the 2007 ACM Symposium on Applied Computing, Mar. 11, 2007, pp. 1654-1661 (8pgs).

Examination Report Communication pursuant to Article 94(3) EPC issued by the European Patent office (EPO) dated Jun. 29, 2017, in connection with corresponding European Patent Application No. 10175973.6, 9 pages.

* cited by examiner

METHOD AND SYSTEM FOR PROVIDING CONTENT TO A RECIPIENT DEVICE

FIELD OF THE INVENTION

Generally, the invention relates to the field of content delivery to recipient devices. More specifically, the invention relates to the field of streaming-type content delivery to a particular recipient device.

BACKGROUND OF THE INVENTION

The latest developments of internet streaming protocols for delivering multimedia content brought up protocols that allow transmitting content as a set of time-bounded content elements, also referred to as chunks, that are physically separated (e.g. a file is created for each chunk of content) or logically separated (e.g. all chunks of content are stored in a single file with an addressing structure that allows to access any chunk individually). The former technique is used by HTTP Live Streaming or 3GPP adaptive HTTP Streaming, whereas the latter technique is employed by Microsoft Smooth Streaming. The Internet streaming protocols allow a recipient device to download a description file (also known as "manifest" or "play-list") that, among other things, lists location(s) of content elements and describes rules for forming a request to access a content element. To consume content, the recipient device first obtains the description file and then obtains and consumes each content element indicated in the description file.

When multiple recipient devices request the same content element from the server, there is a high probability that some of these recipient devices will receive the content element from the cache of an intermediate network node, instead of from the server itself. Receiving content elements from intermediate network node caches provides for scalability of the content delivery network, reduces the load for the streaming server and decreases delivery latency.

SUMMARY OF THE INVENTION

It is an object of the invention to provide a method and system that allow tracing of and/or protection against illegal copying of content in streaming content delivery networks.

One aspect of the invention discloses a computer-implemented method for providing content to a particular recipient device of a plurality of recipient devices. Copies of one or more content elements of the content are generated and one or more of the copies are modified to obtain modified copies of the content elements. The content elements, including the one or more modified copies of the content elements, are stored in a storage. Selection information is transmitted to the particular recipient device in response to a request for providing the content. The selection information prescribes to the recipient device the modified copy to be retrieved by the recipient device for substantially each content element for which a modified copy is available.

In another aspect of the invention, a system for providing content to a particular recipient device of a plurality of recipient devices over a network is disclosed. The system comprises a copy generator configured for generating copies of one or more content elements of the content and a modifying module configured for modifying one or more of the copies of the content elements to obtain modified copies of the content elements. The system further comprises a processor and a transmitter and has access to a storage. The storage is configured for storing the content elements, including the one or more modified copies of the content elements. The processor is configured for generating selection information prescribing to the recipient device the modified copy to be retrieved by the recipient device for substantially each content element for which a modified copy is available. The transmitter is configured for transmitting the selection information to the particular recipient device in response to a request from the recipient device.

By producing several copies of a content element, each of the copies being modified differently, a data structure of selection information can be created that instructs the recipient device which copy for a particular content element should be retrieved for accessing and rendering the content. Modified copies of a content element may e.g. relate to different watermarks (claim 2) used for (copies of) the content element or to different encryption steps (claim 3) applied for (copies of) the content element. The selection information enables customization of the sequences of content elements for the particular recipient device as the selection information varies for different recipient devices and each recipient device is enforced to retrieve only the prescribed copies. By applying the modification to individual content elements, modified copies of the content elements can be stored in one or more caches of intermediate network nodes in the delivery network. The modified copies can be retrieved from these caches, instead of from the server, when a modified content element reference is common to the selection information of multiple recipient devices as may occur frequently.

The embodiments of the invention as defined in claims 2 and 9 allow the sequence of content elements to be individualized for a particular recipient device or session with the device by selecting different particular copies with watermarks to obtain a unique combination of watermarks for that device or session. Watermarking involves the insertion of unique information into the content elements in a non-removable manner and in a manner typically not or hardly noticeable for the user at the receiving side. The unique combination of watermarks enables tracing a recipient device redistributing the content without authorization.

The embodiments of the invention as defined in claims 3 and 10 provide for a different type of modification, viz. encryption. The embodiment allows content encryption while maintaining the advantage of caching of content elements in a delivery network. Encryption can be combined with watermarking, if required.

The embodiments of the invention as defined in claims 4 and 11 enable application of the invention for adaptive streaming. Adaptive streaming protocols extend the basic content streaming protocols with support for the delivery of content over a network infrastructure that has no Quality-of-Service guarantees. Copies of the same content elements with different encoding characteristics are generated. Examples of different encoding characteristics include different bit-rates and/or different spatial resolution. Copies with different encoding characteristics are also referred to as quality levels. Since each quality level (copy) consists of a sequence of time aligned content elements, a recipient device determines to request such a content element from one of several quality levels at run-time to react to varying network transmission and/or processing conditions.

It should be appreciated that copies of content elements may be generated either before or after generating content elements.

The embodiments of the invention as defined in claims 5 and 12 provide for different methods of storing the content elements. In one embodiment, content elements are stored as individual files in accordance with e.g. 3GPP adaptive HTTP Streaming or HTTP Live Streaming. Further information on the latter protocol can e.g. be obtained from Roger Pantos ed, "HTTP Live Streaming" 2009, available at http://tools.ietf.org/id/draft-pantos-http-live-streaming-00.txt which is incorporated in the present application by reference. Alternatively, the content elements may be contained in a single file in an addressable manner in accordance with e.g. Microsoft SmoothStreaming as known e.g. from Microsoft document "IIS Smooth Streaming Transport Protocol", March 2009 by A. Zambelli, available at http://www.microsoft.com/downloads/en/details.aspx?displaylang=en&FamilyID=03d22583-3ed6-44da-8464-b1b4b5ca7520.

The embodiment of the invention as defined in claim 6 defines that the number of requests for content elements issued by the recipient devices for retrieving the content is less than the number of requests for content elements received at the server, thereby expressing that a number of requests is fulfilled from caches at intermediate network nodes.

The embodiments of the invention as defined in claims 7 and 13 avoid structured naming of the (modified copies of the) content elements and complicates making educated guesses for references to differently modified copies by attackers attempting to circumvent e.g. a watermarking tracking mechanism. The destructuring can be implemented in various manners, e.g. by randomizing the references or by applying a hash function to the references.

Still other aspects of the invention relate to a, preferably non-transitory, computer program for performing the method of one or more of the claims 1-7, to a data structure representing the selection information as described herein and to a client device configured for processing such a data structure. Examples of time indications are time durations, time slots and point in time.

Hereinafter, embodiments of the invention will be described in further detail. It should be appreciated, however, that these embodiments may not be construed as limiting the scope of protection for the present invention.

DETAILED DESCRIPTION OF THE DRAWINGS

Figure 1:
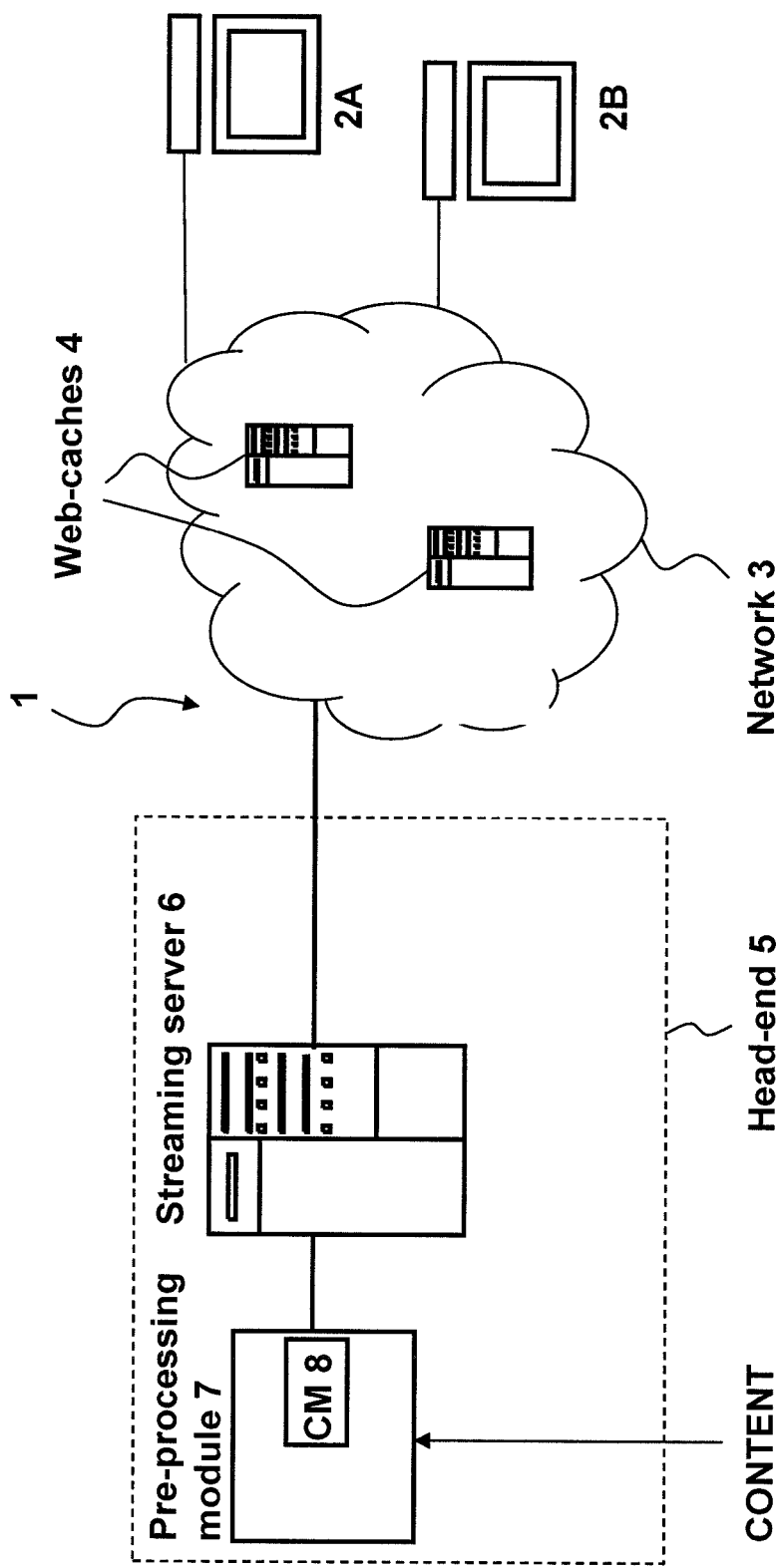
FIG. 1 is a schematic illustration of a content delivery infrastructure according to an embodiment of the invention.

FIG. 1 is an illustration of a content delivery infrastructure 1 for providing content to a particular recipient device 2A of a plurality of recipient devices 2A, 2B over a network 3 according to an embodiment of the invention. Network 3 may e.g. represent the internet. The network 3 comprises one or more network nodes 4 containing caches for storing data.

The infrastructure 1 employs a head-end 5 comprising a streaming server 6 receiving input from a pre-processing module 7. Streaming server 5 comprises a storage (see FIG. 2) for storing content elements CE, as will be explained in more detail below. The streaming server 6 may represent a system of servers, each of the servers being located near a subset of recipient devices.

The pre-processing module 7 comprises an input for receiving clear content and comprises a content modifier CM 8. The output of the pre-processing module 6 is connected to the input of the streaming server 6.

Figure 2:
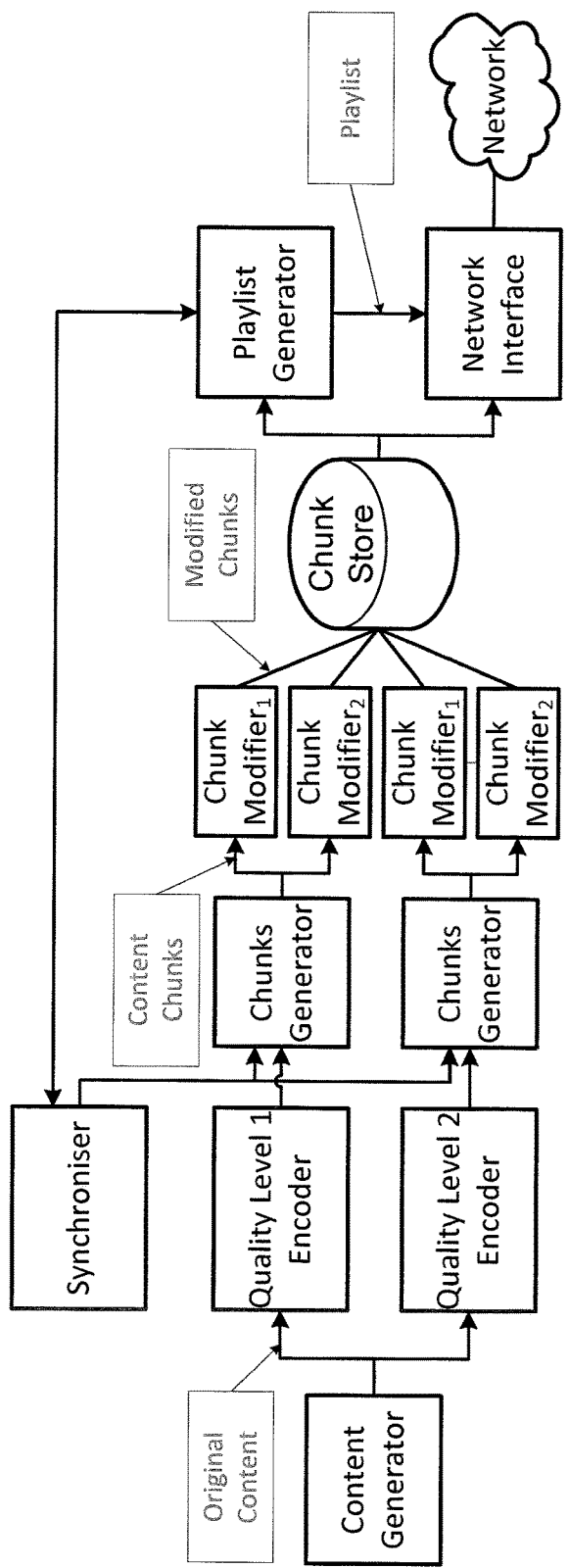
FIG. 2 is a schematic illustration of a head-end system of the content delivery structure of FIG. 1 according to an embodiment of the invention.
Figure 3:
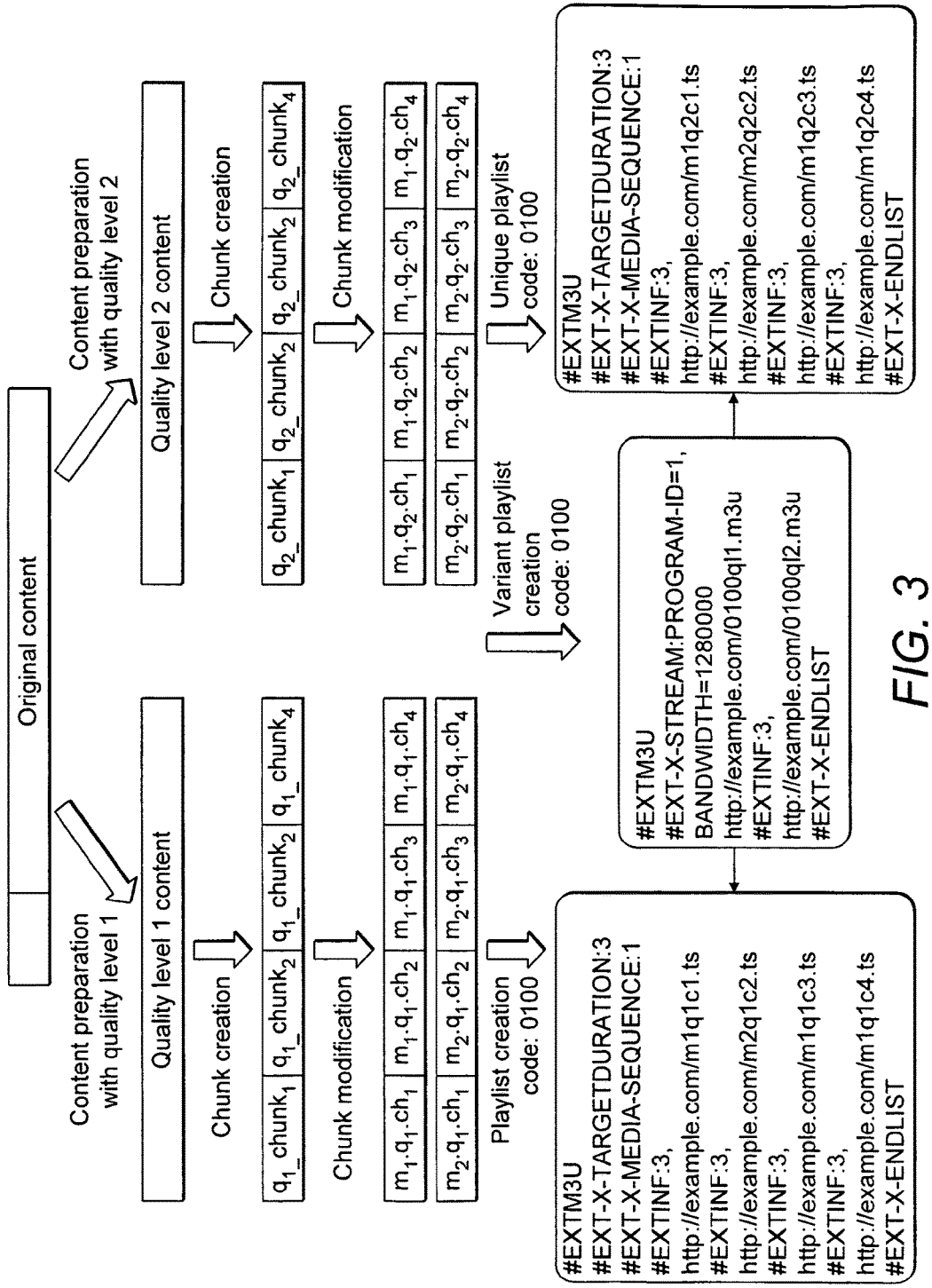
FIG. 3 is a diagram illustrating the creation of selection information for HTTP Live Streaming according to an embodiment of the invention using the head-end system of FIG. 2.

FIGS. 2 and 3 provide an embodiment of applying the content delivery infrastructure of FIG. 1 using HTTP Live Streaming. HTTP Live Streaming breaks the content stream into a sequence of short content elements, also referred to as chunks herebelow, of equal duration. HTTP Live Streaming is an example of an adaptive streaming protocol. Adaptive streaming protocols extend the basic content streaming protocols with support for the delivery of content over a network infrastructure that has no Quality-of-Service guarantees. These protocols extend the concept of chunk-based transmission by providing multiple copies of the same content with different encoding characteristics, such as different bit-rates and/or different spatial resolutions. Since each quality level (copy) consists of a sequence of time aligned chunks, a recipient device may request such a chunk from one of several quality levels at run-time to react to varying transmission and/or processing conditions.

The architecture diagram of FIG. 2 shows two quality level encoders to render the content at two different encoding characteristics, e.g. bitrates, also referred to as quality levels herebelow. The two chunk generators are time synchronised to enable smooth transitions between content chunks of different quality levels. The Playlist Generator generates selection information in the form of a playlist on the basis of information in the chunk store. Since in the adaptive streaming content delivery model, the original content chunk is made available in one or more quality levels. This provides a layer of indirection in the playlist that gives a recipient device the option to select the most suitable content chunk. The duration of the chunk rendering is shared between the Synchroniser and the Playlist generator.

It should be noted that in the alternative embodiment the chunk creation may precede the generation of different quality levels.

Subsequently, one or more of the chunks is modified to generate two or more modified copies of a chunk using content modifier CM 8 in FIG. 1. This adds a further layer which converts a chunk of a particular quality level into one or more modified content chunks. The modification may comprise the addition of a watermark or the encryption the chunk, or a combination of these two. It is not necessary that all chunks are modified, e.g. a watermark may only require a fairly small fraction of all content chunks to be modified.

The above-described operations may be performed in one or more pre-processing modules 7 of the head-end 5. The one or more pre-processing modules 7 may or may not be part of the streaming server 6.

The chunks, including the one or more modified copies the chunks, are then stored in a storage accessible to the streaming server 6.

The operation of the system is now described in further detail with reference to FIG. 3.

First the original content is processed and the processing result is stored in the storage. To that end, the content is made available at two quality levels and these are split into chunks in a way that seamless transition between chunks of different quality levels are enabled. In the embodiment of FIG. 3, the original content (assuming that it is already encoded) is split into a set of small media files of equal duration. More specifically, the chunk creation produces five media files—$chunk_1$, $chunk_2$, $chunk_3$, $chunk_4$ and $chunk_5$. Each chunk has duration of 3 seconds.

The subsequent chunk modification step converts each quality level chunk (e.g. $q_1.c_3$) into two modified chunks ($m_1.q_1.c_3$ and $m_2.q_1.c_3$). The modification may be the addition of a watermark symbol where two related modified chunks (e.g. $m_1.q_i.c_j$ and $m_2.q_i.c_j$) contain two different watermark symbols but represent the same content at different quality levels. In the example of FIG. 3, a sequence of four watermark symbols is present in the sequence of the four content chunks. As the modified chunks $m_1.q_i.c_j$ and $m_2.q_i.c_j$ contain the same content, the recipient device may retrieve only one of these chunks and still obtain the same content (chunk $c_j$ at the desired quality level $q_i$) but with a different modification ($m_1$ or $m_2$).

At the start of the streaming session, the recipient device downloads selection information in the form of a description file (in the format of an M3U playlist) that contains one or more ordered lists of media URL references to media files (each media file contains a single chunk of content) that the recipient device can fetch. With the content chunks prepared as described above, the streaming server generates the selection information to obtain a unique content file to a specific receiver. The duration value of a content chunk is defined prior to segmentation and is stored in the playlist in EXT-X-TARGETDURATION tag. All the streaming content recipient devices use the content URL references to obtain various parts of the content. A variant playlist is generated to enable the recipient device to retrieve the appropriate quality level. The variant playlist refers to further playlists with direct references to modified content chunks. By selecting a unique sequence of modified content chunks, the adaptive streaming system can construct a unique content file for a particular streaming content recipient device.

For example, the adaptive streaming server 6 in FIG. 1 can prepare a playlist for each quality level with a unique sequence of modified chunk references to insert a unique sequence of watermark symbols. In FIG. 3, the sequence '0100' is inserted by the modified content chunk sequence ($m_1\ q_i.c_1, m_2\ q_i.c_2, m_1\ q_i.c_3, m_1\ q_i.c_4$). For each quality level, the appropriate water-marking symbol will be generated in the output of the recipient device 2A. Even if the recipient device switches randomly between instances of the playlist of the first quality level and the playlist of the second quality level (e.g. as a result of network transmission times and/or processing conditions), the watermarking will be performed in accordance with the sequence '0100' as long as the order of the content chunks $c_1, c_2, c_3, c_4$ is maintained. Thus, by making a unique sequence of modified content chunks, the adaptive streaming system constructs a unique content file for each particular recipient device.

In case the modification is the encryption with a key $K_1$ or $K_2$, the DRM/CA system client in the streaming content recipient device issues the appropriate key sequence to decrypt the specific sequence of modified (encrypted) content chunks. In the example, the key sequence is $K_1, K_2, K_1, K_1$. Combinations of watermarking and encryption can be addressed in the same way.

In a variant implementation, the combination of watermarking and encryption is handled by the use of an additional chunk processing layer in the adaptive streaming content delivery system. This would introduce yet another stage in the content preparation process and in the selection information generation.

It should be appreciated that switching between chunks should preferably be substantially seamless, so the chunks may need to be synchronised to enable seamless switching. Due to the synchronisation, implementations may vary the order in which the content preparation processes are performed, as long as the chunk synchronisation is maintained during the processing.

It should further be noted that the requested sequence of quality levels can also be used for tracking purposes. The downside of this approach is that the chunk references might be served from a web cache of an intermediate node, which will not be visible to the head-end 5.

Figure 4:
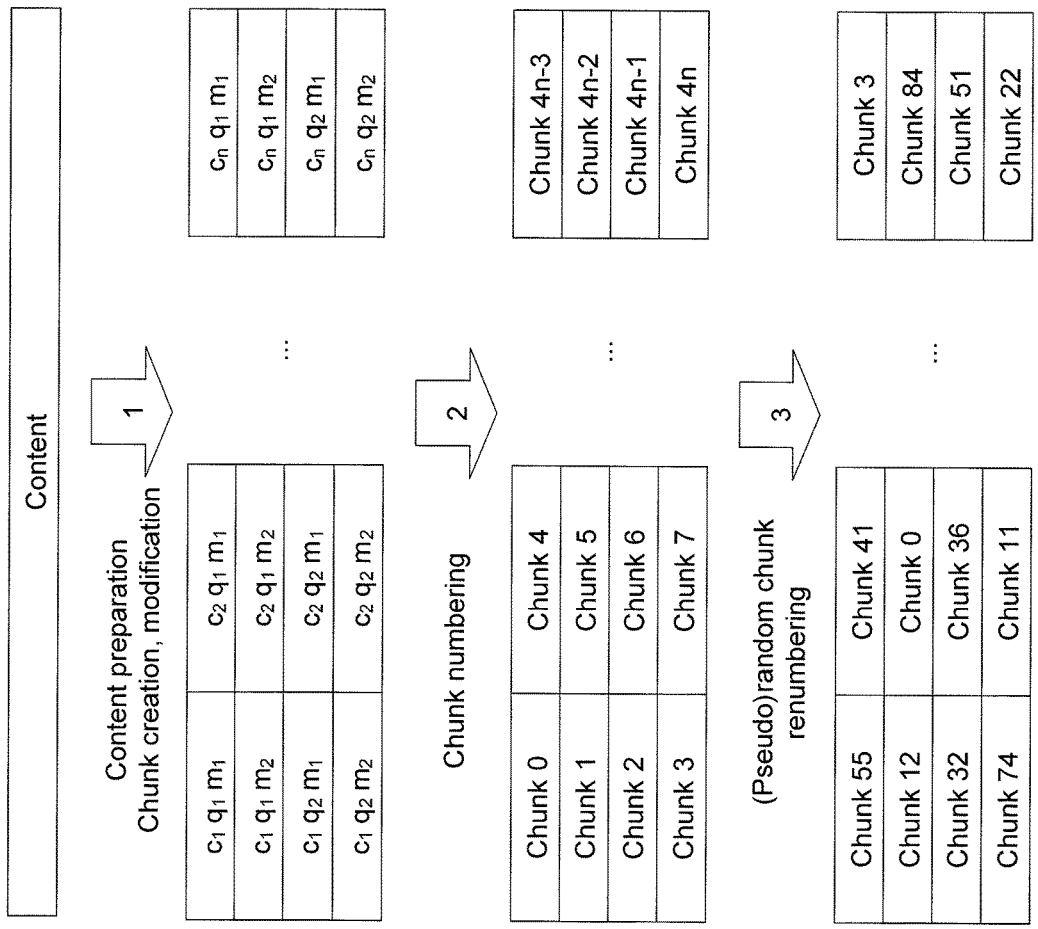
FIG. 4 displays a method for randomizing references to content elements.

The selection information playlists in the example of FIG. 3 has a structured naming sequence for modified content chunks. This may allow an attacker to make educated guesses for alternative content chunks and create content in a way that by-passes the tracking mechanism based on watermarking. Hence, an attacker should preferably be unable to guess which modified content chunks contain the same content. This can be achieved by applying a pseudo-random permutation, as illustrated in FIG. 4

In the first content preparation step, chunk creation and chunk modification are performed as described with reference to FIGS. 2 and 3. FIG. 4 depicts this for two different quality settings ($q_1$ and $q_2$) and two different modifications ($m_1$ and $m_2$).

The second step assigns a unique number to each chunk. For instance, a chunk with label $c_i q_j m_k$ can be assigned number $4i+2j+k$. It should be noted that it may then still be straight-forward for an attacker to guess which chunk numbers contain the same content. For example, in FIG. 4, chunks 0 through 3 contain the same content in different quality levels and with different modifications.

In the third step, each chunk is assigned a (pseudo)random number. Renumbering is done by selecting a pseudorandom permutation σ, and applying this to the unique number of each chunk. For example, in the above figure we have that σ(0)=55 and σ(1)=12. In this way, an attacker cannot predict which content chunks contain the same piece of content. It is possible to make the permutation unique for each piece of (original) content, by seeding a pseudorandom permutation generator with e.g. the original filename.

Figure 5:
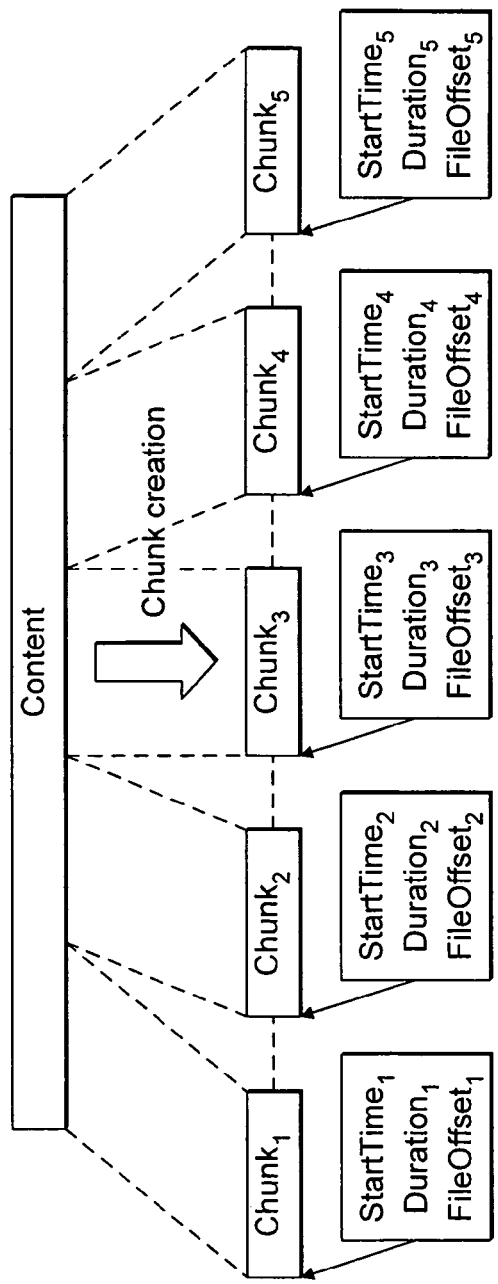
FIG. 5 is a schematic illustration of storing content elements in a storage of the head-end system.

Whereas in the embodiment of FIG. 3 the content chunks were stored individually in accordance with HTTP Live Streaming, the content chunks may also be stored together in one or more (bigger) files, e.g. a file of multiple content chunks representing the content for each particular quality level. Individual content chunks may e.g. be identified by a start time, a duration and a file offset as shown in FIG. 5. This manner of storing the content is e.g. applied by Microsoft Soft Streaming. The file format may e.g. be MPEG-4. The Smooth Streaming specification defines each content chunk as an MPEG-4 Movie Fragment and stores it within a contiguous MPEG-4 file for easy access for each quality level. The content chunks may e.g. be defined as video groups of pictures (GOPs). When a recipient device requests a specific content element from a streaming server applying Microsoft Smooth Streaming, the server dynamically find the appropriate Movie Fragment with the contiguous file and send it over the network as a standalone file, such that web caching is supported. In other words, the content is stored as a single file per quality level, but it is transferred to a recipient device as a series of small file chunks.

Storing content chunks in this manner provides for a slightly different approach for presenting individual recipient devices with customized sequences of content chunks while still enabling caching of one or more content chunks.

Suppose that a recipient device requests content chunks in the form of a RESTful URL: http://video.foo.com/NBA.ism/QualityLevels(400000)/Fragments (video=610275114) to request content delivery from a server. The values in the URL represent encoded bit rate (400000) and the fragment start offset (610275114) expressed in an agreed-upon time unit (e.g. 100 nanoseconds. These values are known from a client manifest obtained from the server. As the URL is generated in the recipient device and the parameter fields are linked to the decoding steps of the content, a slightly different mechanism is used to implement the proposed watermarking scheme. The server issues selection information that contains a chunk name lookup table or a reference to a chink name lookup table. This enables the recipient device to replace the filename (NBA.ism in the above example) for a particular content chunk characterised by its start time and duration or end time with the chunk name (e.g. NBA023343.ism) and provide a table that maps timestamps to chunk names. The chunk name lookup table can be individualised by the server to map the sequence of timestamps to a unique sequence of chunk names for watermarked chunks.

The following examples illustrate the operation of this content delivery method.

A recipient device 2A issues a URL: http://video.foo.com/NBA.ism/QualityLevels(400000)/Fragments (video=610275114). The server returns selection information in the form of a chunk name lookup table for a sequence 0110 of watermarking symbols:

| | |
|---|---|
| 609275114 | NBA182912.ism |
| 610275114 | NBA023343.ism |
| 611275114 | NBA963713.ism |
| 612275114 | NBA119992.ism |

The chunk name lookup table is then used by the recipient device 2A to request four content chunks using the following URLs:
1. http://video.foo.com/NBA182912.ism/QualityLevels(400000)/Frag ments(video=609275114)
2. http://video.foo.com/NBA023343.ism/QualityLevels(400000)/Frag ments(video=610275114)
3. http://video.foo.com/NBA963713.ism/QualityLevels(400000)/Frag ments(video=611275114)
4. http://video.foo.com/NBA119992.ism/QualityLevels(400000)/Frag ments(video=612275114)

Another recipient device 2B may issue an identical URL: http://video.foo.com/NBA.ism/QualityLevels(400000)/Fragments (video=610275114). The server returns selection information in the form of a chunk name lookup table for a different sequence 0010 of watermarking symbols:

| | |
|---|---|
| 609275114 | NBA182912.ism |
| 610275114 | NBA939921.ism |
| 611275114 | NBA963713.ism |
| 612275114 | NBA119992.ism |

The chunk name lookup table is then used by the recipient device 2A to request four content chunks using the following URLs:
1. http://video.foo.com/NBA182912.ism/QualityLevels(400000)/Frag ments(video=609275114)
2. http://video.foo.com/NBA939921.ism/QualityLevels(400000)/Frag ments(video=610275114)
3. http://video.foo.com/NBA963713.ism/QualityLevels(400000)/Frag ments(video=611275114)
4. http://video.foo.com/NBA119992.ism/QualityLevels(400000)/Frag ments(video=612275114)

In the second case the second timeslot references a different chunk name. At the server the chunk name is mapped to a particular content element. However, the third and fourth time slot references are common to the requests for both recipient devices 2A, 2B, such that the server and one of the recipient devices may benefit from previous caching of the third and fourth content elements in an intermediate node in the network 3 of FIG. 1.

Whereas in the above example relating to Microsoft Smooth Streaming quality levels are not applied, it should be appreciated that this would simply add another layer to the example without deviating from the primary mechanism for defining customizable sequences of content chunks in the server.

Figure 6:
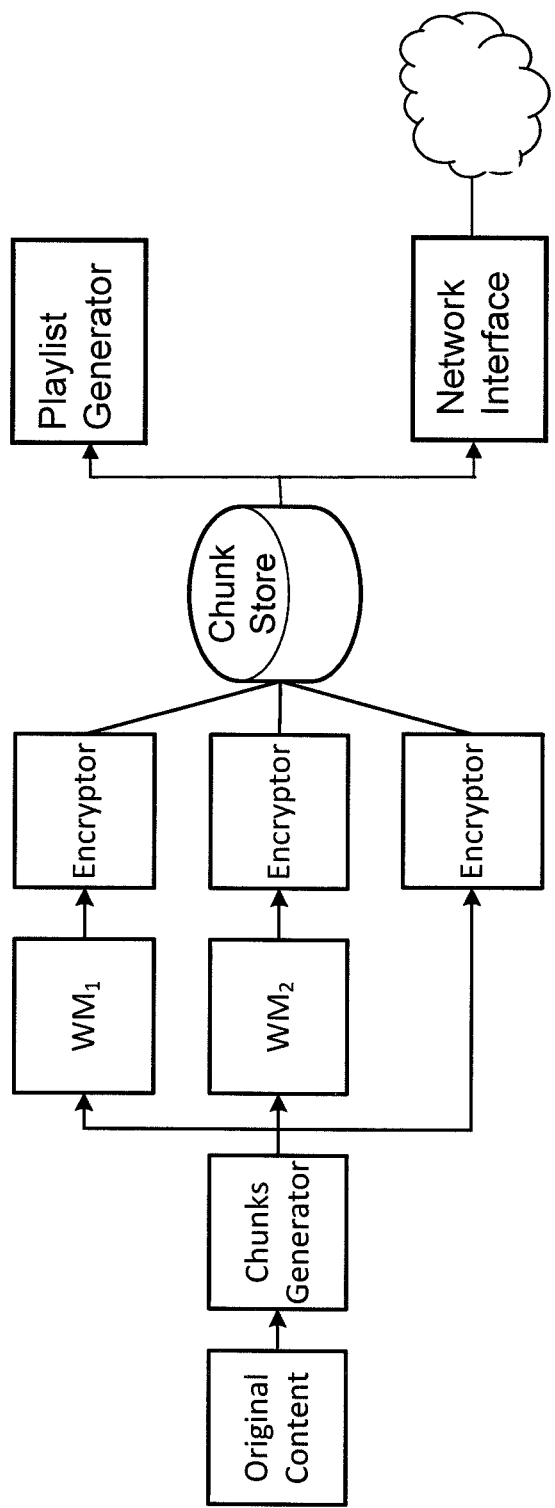
FIG. 6 is a schematic illustration of a head-end system according to an embodiment of the invention.

FIG. 6 provides an example of an architecture for an embodiment of the invention wherein quality level differentiation is absent, i.e. adaptive streaming is not applicable. The operation of this architecture can be thought of as a simplified version of FIG. 3 omitting the quality level indictor.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The computer program may be run on a processor in the head-end 5, preferably in the streaming server 6.

The invention claimed is:

1. A computer-implemented method for providing content to a particular recipient device of a plurality of recipient devices, the method comprising the steps of:
   generating copies of multiple content elements of the content to be provided to the recipient device;
   modifying one or more of the copies of the content elements to obtain modified copies of the content elements;
   storing the content elements, including the one or more modified copies of the content elements, in a storage; and
   customizing a sequence of content elements for the recipient device by transmitting selection information to the recipient device in response to a request for providing the content, the selection information prescribing to the recipient device for each of one or more content elements for which a modified copy is available, which copy of said content element or which modified copy available for said content element the recipient device should retrieve;

wherein the step of modifying the copies of the one or more content elements comprises the step of providing different watermarks in different copies of a content element and wherein the selection information prescribes to the recipient device, for each of one or more content elements for which a watermarked copy is available, which copy of said content element or which watermarked copy available for said content element the recipient device should retrieve.

2. The method according to claim 1, wherein the step of modifying the copies of one or more content elements comprises the step of encrypting different copies of a content element under a different key and wherein the selection information prescribes to the recipient device, for each of one or more content elements for which an encrypted copy is available, which encrypted copy available for said content element the recipient device should retrieve.

3. The method according to claim 1, wherein the copies of the content elements comprise copies for different encoding characteristics of a content element in order to provide the content using an adaptive streaming protocol.

4. The method according to claim 1, wherein the step of storing the content elements comprises the step of storing the content elements in separate files or storing the content elements in a single file comprising means for accessing the content elements in the file.

5. The method according to claim 1, wherein the storage storing the content elements is contained in a server and the method further comprises the step of receiving requests for content elements from the recipient device at the server in response to transmitting the selection information, wherein the number of requests for content elements received at the server from the recipient device retrieving the contents is less than the number of content elements stored in the storage.

6. The method according to claim 1, further comprising the steps of destructuring references to the content elements in the selection information.

7. A system for providing content to a particular recipient device of a plurality of recipient devices over a network, wherein the system comprises a processor operatively coupled to a memory and a non-transient computer readable medium having computer readable instructions stored therein, which when executed by the processor, cause the processor to:
generate copies of multiple content elements of the content to be provided to the recipient device;
modify one or more of the copies of the content elements to obtain modified copies of the content elements;
store the content elements, including the one or more modified copies of the content elements, in a storage; and
customizing a sequence of content elements for the recipient device by transmitting selection information to the recipient device in response to a request from the recipient device, the selection information prescribing to the recipient device, for each of one or more content elements for which a modified copy is available, which copy of said content element or which modified copy available for said content element the recipient device should retrieve;
wherein the instructions further cause the processor to provide different watermarks in different copies of a content element and wherein the selection information prescribes to the recipient device, for each of one or more content elements for which a watermarked copy is available, which copy of said content element or which watermarked copy available for said content element the recipient device should retrieve.

8. The system according to claim 7, wherein the processor is arranged to encrypt different copies of a content element under a different key and wherein the selection information prescribes to the recipient device, for each of one or more content elements for which an encrypted copy is available, which encrypted copy available for said content element the recipient device should retrieve.

9. The system according to claim 7, wherein the system comprises a plurality of encoders configured for providing different encoding characteristics for different copies of at least one content element and wherein the system is configured to provide the content using an adaptive streaming protocol.

10. The system according to claim 7, wherein the storage is configured to store the content elements in separate files or as a single file comprising means for accessing the content elements in the file.

11. The system according to claim 7, wherein the system is further configured for destructuring references to the content elements in the selection information.

12. A non-transitory computer readable medium storing a data structure that comprises selection information configured for enforcing a recipient device to retrieve a customized set of modified content elements of streaming content to be rendered by the recipient device.

13. A recipient device comprising a processor operatively coupled to a memory and a non-transient computer readable medium having computer readable instructions stored therein, which when executed by the processor, cause the processor to process a data structure that comprises selection information configured for enforcing the recipient device to retrieve a customized set of modified content elements of streaming content to be rendered by the recipient device, wherein the data structure comprises a lookup table or a reference to a lookup table, the lookup table indicating different references to the modified content elements for different time indications and wherein the processor is configured to request the modified content elements over a network using the one or more different references at the indicated time indications using the lookup table.

14. The method of claim 1, further comprising generating the selection information.

15. The system of claim 7, wherein the processor is further arranged to generate the selection information.

* * * * *